Figures 1, 2:
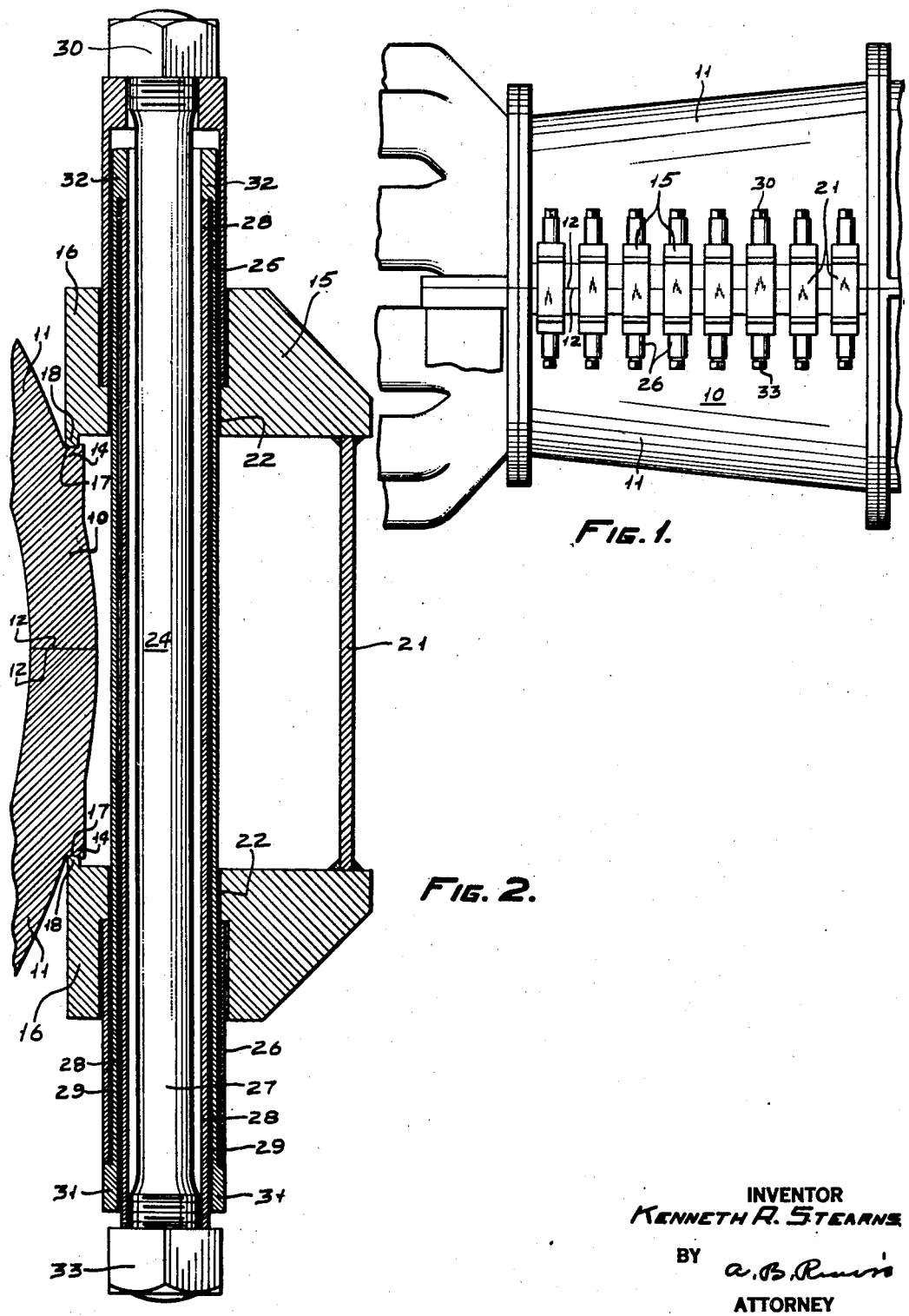

Dec. 21, 1948.  K. R. STEARNS  2,457,073
TURBINE CYLINDER JOINT
Filed Nov. 7, 1946

INVENTOR
KENNETH R. STEARNS
BY
ATTORNEY

Patented Dec. 21, 1948

2,457,073

UNITED STATES PATENT OFFICE 2,457,073

TURBINE CYLINDER JOINT

Kenneth R. Stearns, Springfield, Pa., assignor to Westinghouse Electric Corporation, East Pittsburgh, Pa., a corporation of Pennsylvania Application November 7, 1946, Serial No. 708,334

3 Claims. (Cl. 189—36)

The invention relates to a cylinder which is substantially symmetrical and having its joint faces pressed together by clamp means acting thereon in such a manner that the application of moments thereto tending to distort it out of round are minimized and it has for an object to provide apparatus of this character wherein the jaws of each clamp are pressed toward each other by a bolting structure comprising a plurality of telescopic members which function compressively and tensionally in series to act compressively on the jaws.

A further object of the invention is to provide apparatus of the above character wherein the cylinder joint clamping means includes tension and compression members which compensate each other to minimize change in bolting stress due to change in temperature.

A further object of the invention is to provide a clamping bolt structure of the above character wherein a pair of sleeves compressively engage the respective clamp jaws and are respectively compressively engaged by one end of a bolt and by one end of a tension tube in telescopic relation with respect to each other and to the sleeves together with a bolt-telescoping compression tube compressively engaging the other end of the tension tube and which is compressively engaged by a nut carried by the other end of the bolt.

The foregoing and other objects are effected by the invention as will be apparent from the following description and claims taken in connection with the accompanying drawings, forming a part of this application, in which:

Fig. 1 is a side elevation of a cylinder having the improved clamping means; and Fig. 2 is a fragmentary detail sectional view showing the cylinder joint and a clamp.

In the drawings, there is shown a cylinder, at 10, including halves 11—11 provided with joint faces 12—12 and oppositely-facing lugs 14—14 at opposite sides of the joint. A plurality of clamps 15 cooperate with the lugs to engage the joint faces under pressure.

Each clamp includes a pair of jaws 16—16 having their inner ends engaging the lugs 14—14. Preferably, the lugs have grooves 17 and the jaws have ribs 18 fitting the grooves in order that the centroid of clamping pressure may be located at or near to the centroid of hoop tension at the joint. The clamping pressure centroid is kept within one-quarter of the wall thickness from the hoop tension centroid.

A strut 21 connects the outer end portions of the jaws and the latter have aligned openings 22 between the struts and their inner ends and as near as practicable to the latter. The strut has sufficient flexibility to permit of spreading of the inner ends of the jaws so that the ribs may pass over the lugs and snap into the grooves of the latter.

The jaws 16—16 are compressively engaged by the bolting structure, at 24, having sufficient elastic extensibility for a relatively low bolt structure spring scale.

Each bolting structure, at 24, includes compression sleeves 25 and 26 compressively engaging the respective jaws. A bolt 27, a compression tube 28 and a tension tube 29, all in telescopic relation, extend through the aligned openings. A nut 30 carried by one end of the bolt compressively engages the sleeve 25. One end of the tension tube 29 is formed with a shoulder 31 which compressively engages the sleeve 26 and the other end of the tension tube is formed with a shoulder 32 compressively engaged by the compression tube 28. A nut 33 carried by the other end of the bolt compressively engages the compression tube.

It will be apparent that the bolt structure is comprised by a pair of tension members, the parts 27 and 29, compressively engaging the jaws, a compression member, part 28, compressively engaging one of the tension members and being compressively engaged by a nut carried by the other tension member.

The telescopic relation of the bolt, tubes and sleeves functioning in a series manner to act compressively on the jaws gives to a bolting structure of reasonable length the elastic properties of a long bolt, that is, the bolt spring scale is thereby rendered lower, with the result that change in bolting stress incident to differential expansion of the cylinder and the bolting structure is minimized, in consequence of which a more uniform degree of joint tightness may be maintained under conditions of rapid heating and cooling of the cylinder. As each tube has approximately the same sectional area as that of the reduced portion of the bolt, the structure is of uniform strength and the spring rate is a minimum. Furthermore, the tension and compression tubes tend to compensate each other for temperature changes with the result that tendency of the compression tube to change the bolting stress in one direction due to change in temperature is substantially neutralized by tendency of the tension tube to change such stress in the other direction.

While the invention has been shown in but one form, it will be obvious to those skilled in the art that it is not so limited, but is susceptible of various changes and modifications without departing from the spirit thereof.

What is claimed is:

1. In a cylinder structure, a cylinder including halves having joint faces, such halves having oppositely-facing lugs at opposite sides of the joint, and clamping means bearing against the lugs causing the joint faces to engage under pressure; said clamping means comprising a plurality of clamps and each clamp including a pair of jaws having lug-engaging inner ends, a strut connecting the outer end portions of the jaws, said jaws having aligned openings between the strut and the inner ends thereof, first and second tension members extending through the aligned openings, said members each having one end thereof acting compressively on the respective jaws, a compression member extending through the openings and compressively engaging the other end of the second tension member, and a nut carried by the other end of the first tension member and compressively engaging the compression member.

2. In a cylinder structure, a cylinder including halves having joint faces, such halves having oppositely-facing lugs at opposite sides of the joint, and clamping means bearing against the lugs causing the joint faces to engage under pressure; said clamping means comprising a plurality of clamps and each clamp including a pair of jaws having lug-engaging inner ends, a strut connecting the outer end portions of the jaws, said jaws having aligned openings between the strut and the inner ends thereof, bolts extending through the aligned openings, a pair of sleeves for each bolt compressively engaging the respective jaws, tension and compression tubes for each bolt extending through the aligned openings, each bolt and its tension and compression tubes being in telescopic relation, said tension tube having one end compressively engaging one of the compression sleeves and being compressively engaged at its other end by one end of the compression tube, and nuts carried by opposite ends of the bolt and compressively engaging the other compression sleeve and the other end of the compression tube, respectively.

3. Apparatus as claimed in claim 2, wherein each of the sleeves and tubes has approximately the same cross-sectional area as that of the bolt.

KENNETH R. STEARNS.

REFERENCES CITED

The following references are of record in the file of this patent:

UNITED STATES PATENTS

| Number | Name | Date |
|---|---|---|
| 1,965,412 | Guy | July 3, 1934 |
| 2,320,398 | Zetterquist | June 1, 1943 |
| 2,331,880 | Zetterquist et al. | Oct. 19, 1943 |